(12) United States Patent
Rinne et al.

(10) Patent No.: US 9,185,565 B2
(45) Date of Patent: *Nov. 10, 2015

(54) VARIABLE BANDWIDTH IN A COMMUNICATION SYSTEM

(75) Inventors: Mikko Rinne, Espoo (FI); Antti Lappetelainen, Espoo (FI); Pauli Seppinen, Espoo (FI); Jussi Ojala, Helsinki (FI); Aarno Parssinen, Espoo (FI); Risto Kaunisto, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/245,375

(22) Filed: Oct. 3, 2008

(65) Prior Publication Data

US 2009/0093257 A1    Apr. 9, 2009

Related U.S. Application Data

(63) Continuation of application No. 10/771,889, filed on Feb. 4, 2004, now Pat. No. 7,433,708.

(51) Int. Cl.
*H04W 16/12* (2009.01)
*H04W 16/02* (2009.01)
*H04W 16/06* (2009.01)

(52) U.S. Cl.
CPC .............. *H04W 16/12* (2013.01); *H04W 16/02* (2013.01); *H04W 16/06* (2013.01)

(58) Field of Classification Search
CPC ...... H04W 16/02; H04W 16/12; H04W 16/06

USPC .......... 455/552.1, 447–449, 452.2, 454, 436; 370/322, 328, 334, 341

See application file for complete search history.

(56) References Cited

U.S. PATENT DOCUMENTS

| | | | | |
|---|---|---|---|---|
| 5,299,228 | A | * | 3/1994 | Hall .............................. 370/335 |
| 5,430,761 | A | | 7/1995 | Bruckert et al. |
| 5,592,480 | A | | 1/1997 | Carney et al. .................. 370/347 |
| 5,668,837 | A | | 9/1997 | Dent .............................. 375/316 |
| 5,974,323 | A | * | 10/1999 | Doner ........................... 455/447 |
| 6,049,538 | A | * | 4/2000 | Scott .............................. 370/347 |
| 6,091,955 | A | * | 7/2000 | Aalto et al. .................... 455/447 |
| 6,323,823 | B1 | | 11/2001 | Wong et al. .................... 343/844 |
| 6,389,059 | B1 | | 5/2002 | Smith et al. .................... 375/141 |

(Continued)

FOREIGN PATENT DOCUMENTS

| | | |
|---|---|---|
| WO | WO 95/20277 | 7/1995 |
| WO | WO 97/32441 | 9/1997 |

OTHER PUBLICATIONS

Morrow, Robert, K. Jr. : A Narrowband/Wideband Packet Radio System; Proceedings of the 1994 Tactical Communications Conference, May 10-12, 1994; pp. 159-166, vol. 1; Digital Technology fir the Tactical Communicator, Fort Wayne, Indiana, USA.

*Primary Examiner* — Ariel Balaoing
(74) *Attorney, Agent, or Firm* — Harrington & Smith

(57) ABSTRACT

A method, device, and system that use narrowband channels to provide higher re-use without multiplying the operator spectrum requirement. If a communication system supports variable carrier bandwidth channels, the narrow channel capacity can be divided among adjacent cells to provide higher re-use.

20 Claims, 6 Drawing Sheets

(56) References Cited

U.S. PATENT DOCUMENTS

| | | | |
|---|---|---|---|
| 6,535,739 B1 | 3/2003 | Chen et al. | 455/437 |
| 6,573,869 B2 | 6/2003 | Moore | 343/702 |
| 6,771,963 B1 * | 8/2004 | Cheng et al. | 455/437 |
| 2002/0028655 A1 * | 3/2002 | Rosener et al. | 455/16 |
| 2002/0142777 A1 * | 10/2002 | McGovern et al. | 455/450 |
| 2003/0017842 A1 | 1/2003 | Moles et al. | 455/552 |
| 2003/0211831 A1 * | 11/2003 | Xu et al. | 455/63.3 |
| 2005/0232232 A1 | 10/2005 | Farber et al. | 370/352 |

* cited by examiner

VARIABLE BANDWIDTH IN A COMMUNICATION SYSTEM

CROSS-REFERENCE TO RELATED PATENT APPLICATIONS

This application is a Continuation of U.S. application Ser. No. 10/771,889, filed Feb. 4, 2004, incorporated herein by reference in its entirety.

FIELD OF THE INVENTION

The present invention relates generally to high data rate wireless transmission systems and methods. More particularly, the present invention relates to use of variable bandwidth for continuous coverage in a wideband high data rate system.

BACKGROUND OF THE INVENTION

A frequency re-use factor is used in cellular systems to describe how many frequency channels are required for full coverage or, in other words, how close the same frequency can be re-used. In CDMA systems, where users are separated by code, re-use can be as low as 1, i.e. adjacent base stations can use the same frequency. In legacy TDMA systems, such as GSM, the re-use factor can be 7, for example. Modulation techniques being considered for fourth-generation wireless systems (known as "4G" systems) are multi-carrier systems, such as Orthogonal Frequency Division Multiplexing (OFDM) or MultiCarrier Code Division Multiple Access (MC-CDMA). Multi-carrier systems can be designed to have good tolerance against frequency-selective fading. Variable bandwidth can also be provided in such systems.

In 4G systems, capacities of 1 Gbps for a local area and 10 Mbps for wide area coverage have been envisioned. Such high data rates require a wide frequency band. However, even with very wide bandwidths on the order of 100 MHz, the spectral efficiencies needed for these capacities are extremely high. Targeting a spectral efficiency of 10 bits/sec/Hz, a band of 100 MHz is required for 1 Gbps throughput. Spectrum availability, though, is limited. In an optimal case, about 1 GHz of spectrum could be allocated for 4G services in some regions, but a typical allocation may be closer to 500 MHz.

To support multiple operators, the frequency re-use factor should be very low. Continuous coverage is difficult to provide in a system without spreading, when there is interference from neighbors in the cell borders. FIG. 1 illustrates a system simulation gain that can be achieved with the increase of frequency re-use from 1 to 4. The observed improvement of 9 dB is very significant and can make the difference between a system having or not having a continuous coverage. The gain increases further if the increased range of the narrowband carrier is taken into account.

U.S. Pat. No. 6,091,955, assigned to the same assignee as the present application, describes techniques for increasing capacity in GSM systems by providing an "intelligent underlay/overlay" (IUO) system. Using these techniques, a set of frequency channels are used with additional lower coverage channels, called "super-reuse channels". The quality of each user is continuously monitored and when the quality is good enough (i.e., the user is close enough to a base station), the call is handed over to a super-reuse channel. These super-reuse channels can have lower reuse factors than normal channels and can be reused even in every cell. As mentioned above, though, spectrum availability is limited.

Thus, there is a need for improved continuous coverage in wideband high data rate systems. Further, there is a need to use variable bandwidth to increase re-use in a communication system. Even further, there is a need for higher frequency reuse without increasing the operator spectrum requirement.

SUMMARY OF THE INVENTION

The present invention is directed to a method, device, and system in which narrowband channels are used to provide higher re-use without multiplying the operator spectrum requirement. If a communication system supports variable carrier bandwidth channels, the narrow channel capacity can be divided among adjacent cells to provide higher re-use of frequency channels in the communication system.

Briefly, one exemplary embodiment relates a method for increasing re-use in a communication system using variable bandwidth. The method includes dividing radio frequencies of the communication system into a wideband channel radio frequency and narrowband channel radio frequencies for which lower frequency re-use is utilized, and allocating to at least some cells of the communication system both the narrowband channel radio frequencies and the wideband channel radio frequency. As such, the narrowband channel radio frequencies are used in cell boundary regions such that narrowband channel radio frequencies are divided among adjacent communication cells. The narrowband channel radio frequencies provide higher re-use of frequency channels without multiplying operator spectrum requirements.

Another exemplary embodiment relates to a device operable in a wireless communication environment and configured to utilize variable bandwidth to provide higher re-use of frequency channels. The device includes a radio interface and a processor. The radio interface communicates with base stations in a wireless communication environment. The processor is coupled to the radio interface and provides commands to modulate both wideband and narrowband carriers. The narrowband channels provide higher re-use of frequency channels without multiplying operator spectrum requirements.

Yet another exemplary embodiment relates to a wireless communication system having a mobile station and a base station. The system uses variable bandwidth to increase the re-use of frequency channels in the wireless communication system. The mobile station has a receiver and a transmitter that are configured to adaptively sample frequency and bandwidth. The base station also has a receiver and a transmitter that are configured to adaptively sample frequency and bandwidth. Narrowband carriers are used in communication between the mobile station and base station to provide higher re-use of frequency channels without multiplying operator spectrum requirements and to control the power consumption of a mobile device.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Assuming a carrier bandwidth of 100 MHz, a full-rate communication channel can be split into more narrow channels for various reasons. Narrower channels can be used for better range, smaller block size for more efficient transmission of smaller packets, lower terminal power consumption, lower terminal price by supporting only the more narrow bandwidth channels, and lower re-use. As an example, splitting a full-rate channel of 100 MHz by four would yield 4*25 MHz channels, and another split would produce 16*6.25 MHz channels. For comparison, WCDMA (Wideband CDMA) uses 5 MHz per carrier. Higher re-use can be provided using the 6.25 MHz channels by several different implementations. Example implementations are described below with reference to FIGS. 2-4.

Figure 1:
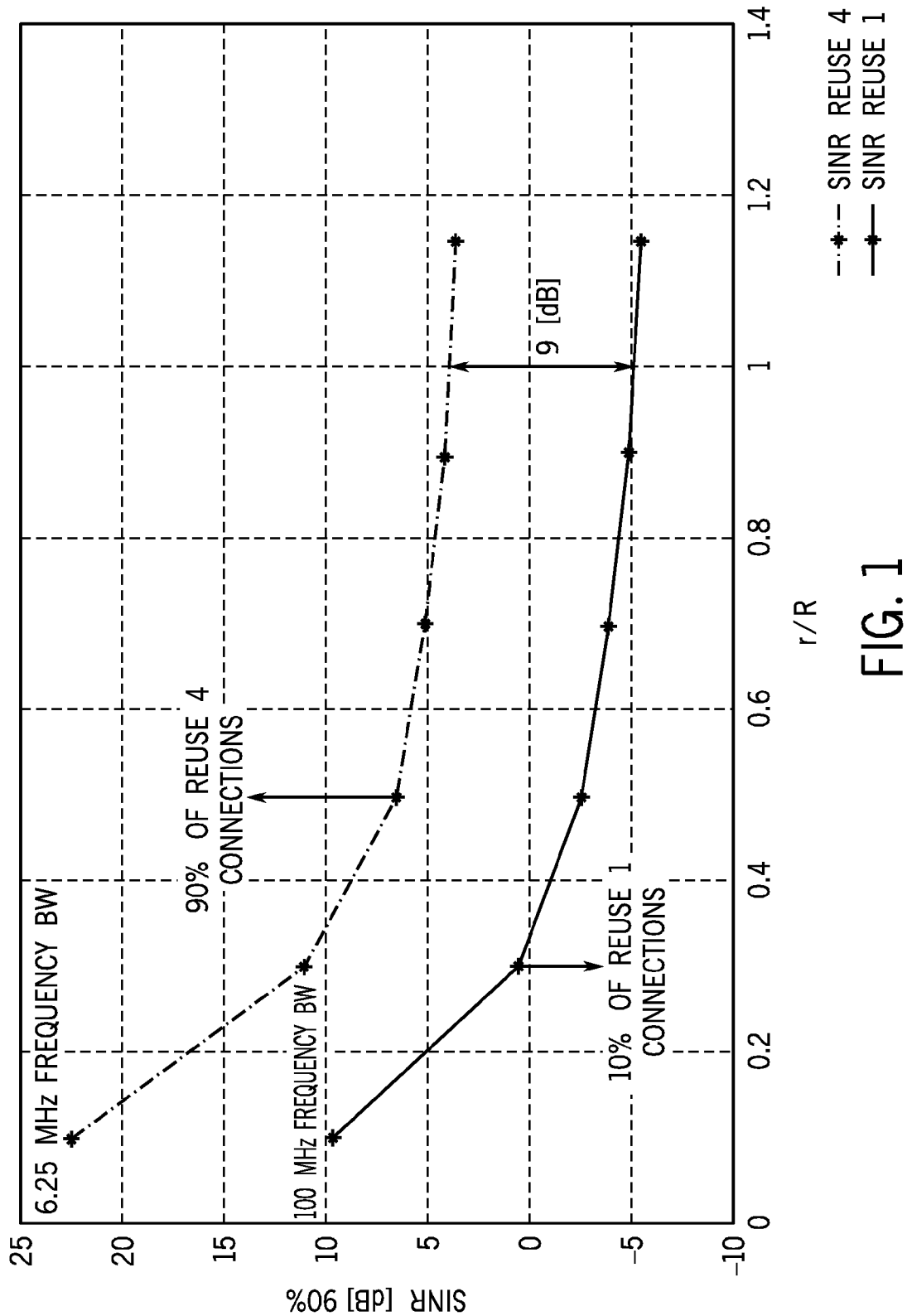
FIG. 1 is a system simulation result comparing re-use 1 at a bandwidth of 100 MHz and re-use 4 at a bandwidth of 6.25 MHz.
Figure 2:
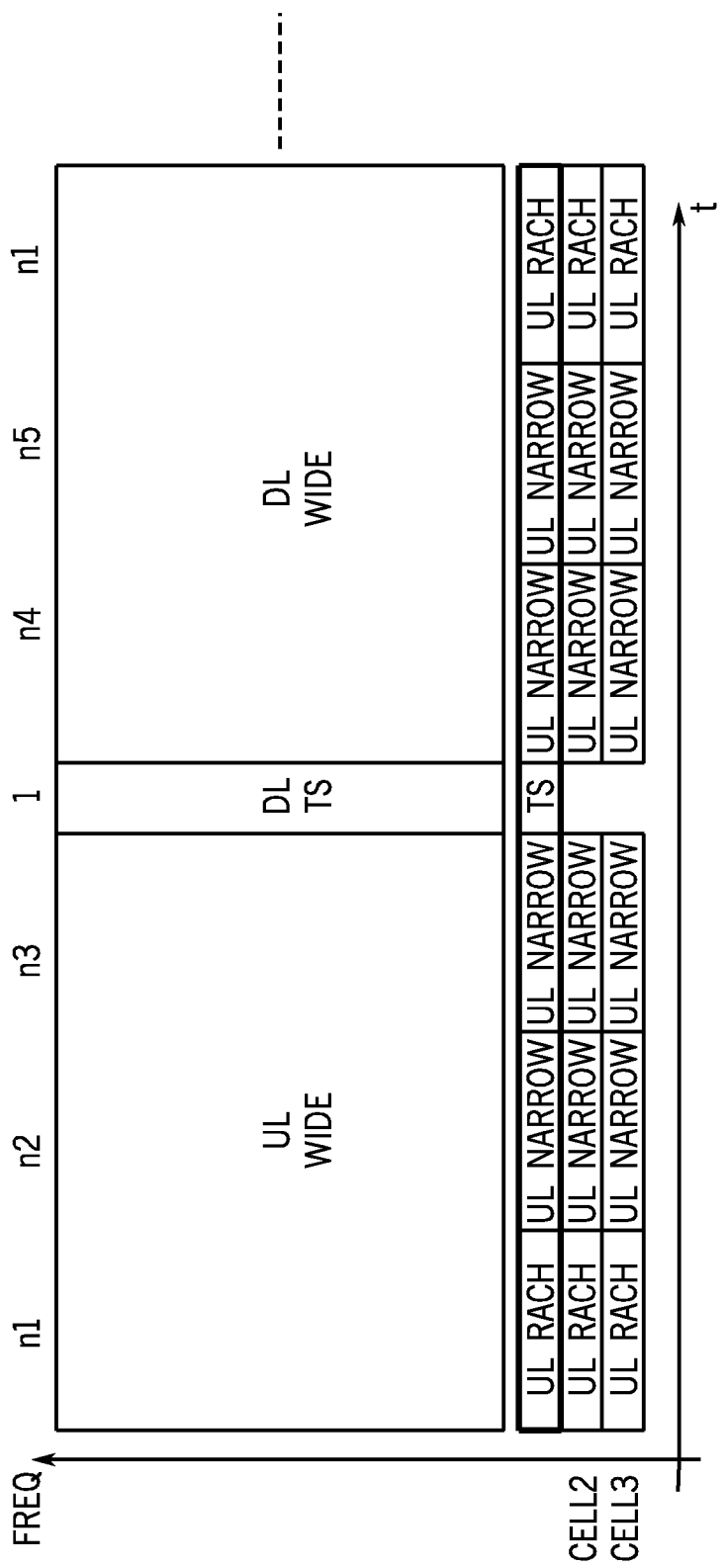
FIG. 2 is a graph depicting narrowband carriers without spreading external to the wideband carrier in accordance with an exemplary embodiment.

FIG. 2 illustrates the use of split channels outside a full-bandwidth channel of 100 MHz. In such an implementation, a terminal that has good channel conditions uses the 100 MHz channel. When the terminal approaches a cell border, it is handed over to an external 6.25 MHz channel and when crossing the cell border, over to the 6.25 MHz channel of the next cell. To provide a re-use of 3, the operator spectrum requirement is 100 MHz+3*6.25 MHz+necessary guard bands. This spectrum requirement could be additionally improved by having the narrowband carriers in a common pool to be shared by different operators.

When arranging narrowband carrier frequencies into a pool, more than one operator needs access to the same frequency. Assuming an example case of three operators having three narrowband carriers each, the total number of narrowband carriers in the pool is 3*3=9. The system can be designed either for all three operators using all 9 narrowband carriers (possibly supported by a shared infrastructure for the handover domains), or the carriers in the pool can be divided based on individual operator needs in difference tell arrangements to provide complete coverage.

Figure 3:
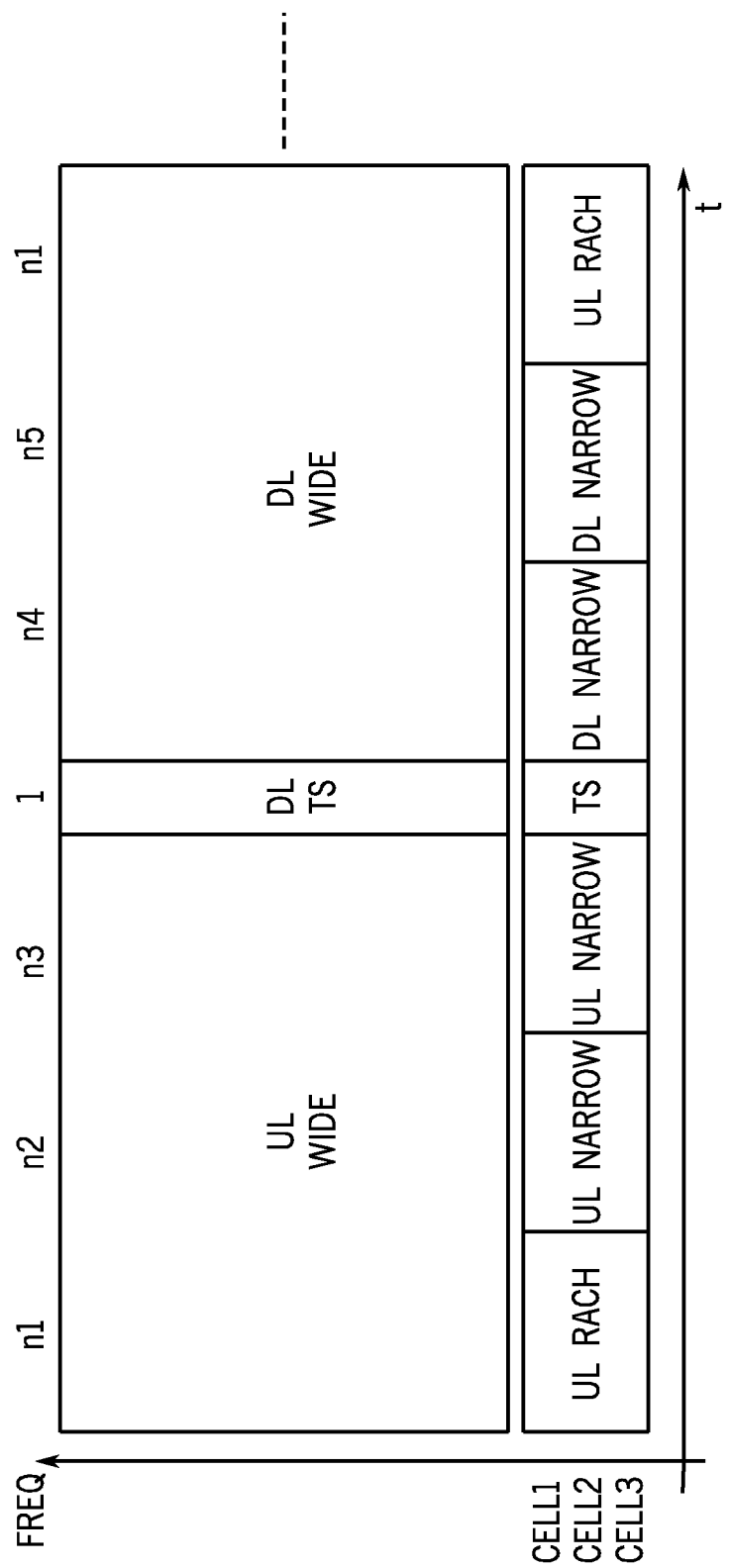
FIG. 3 is a graph depicting narrowband carriers with spreading external to the wideband carrier in accordance with another exemplary embodiment.

FIG. 3 illustrates the use of split channels where a narrowband carrier has spreading outside the full-rate channel. In this approach, the narrowband carrier to be used for handovers and range extension implements CDMA-like spreading and can consecutively be shared among adjacent cells. Compared to the implementation described with reference to FIG. 2, the implementation of FIG. 3 has the flexibility of capacity sharing between neighboring cells on the narrowband channel.

Figure 4:
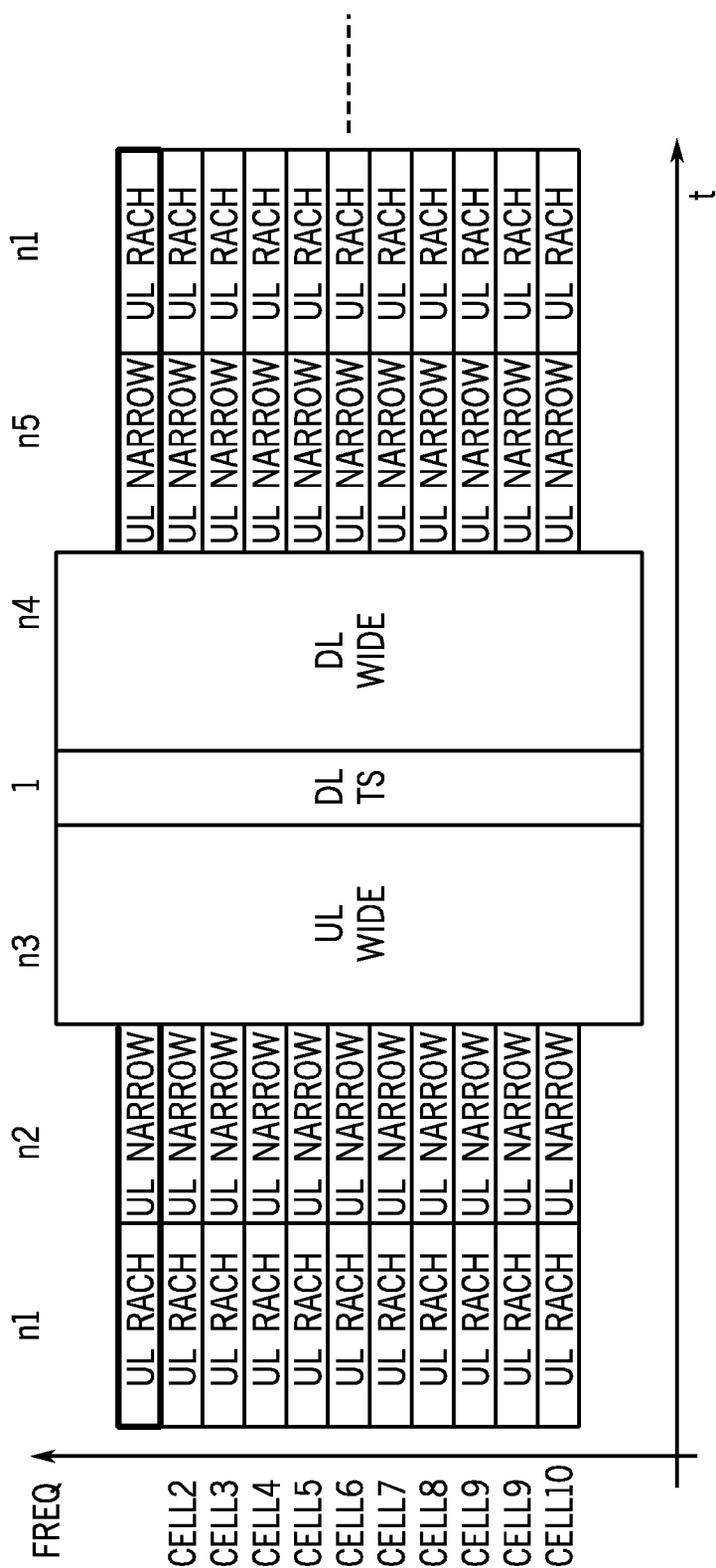
FIG. 4 is a graph depicting narrowband carriers inside the wideband carrier in accordance with yet another exemplary embodiment.

FIG. 4 illustrates the use of split channels where narrowband carriers are inside the full-bandwidth channel. As such, different primary narrowband carriers can be assigned to different cells, which lowers the average interference caused by the users close to the cell border (e.g., high-power users). In this implementation, the operator spectrum requirement can be limited to the original 100 MHz, but the full data rates can only be provided in an isolated cell.

The use of a full-bandwidth channel between cells can be either uncoordinated, in which case there would be benefit only in the form of averaging, or coordinated, in which case all cells would aim to use the full-bandwidth and their respective narrow bandwidths at the same time. The latter solution requires the cells to be synchronized. Even though synchronization has a cost, it is a requirement in some systems, such as a TDD system. The center frequencies of the narrowband carriers can be assigned to base stations either by using network planning or by using carrier selection algorithms at the base station or network.

FIGS. 2 and 3 present TDD (time division duplex) versions of a narrowband carrier deployment. In alternative embodiments, the narrowband carrier deployment is applied for FDD (frequency division duplex) systems. In an exemplary communication system, base stations transmit system information once in a superframe. When narrowband carriers are in use, system information is transmitted by the base stations at least on the narrowband carrier.

In each superframe, the base station uses a narrowband carrier to broadcast scheduling information. The scheduling information optimally covers the duration of at least 2 superframes to facilitate reception in all possible slots without restrictions from hardware limitations. The scheduling information includes information for mobile terminals. The information includes a list of available channels for each separately defined time instant during the scheduling period. The information also contains the terminal identity, i.e. who will use the channel. There may be additional secondary scheduling information transmitted using the wideband channel. Its location is indicated in the master scheduling information at the narrowband.

While performing the scheduling, base stations consider various restrictions. For example, a base station has known delays when switching the center frequency and switching between transmission and reception. In a base station, there are typically separate synthesizers for the receiver and transmitter, helping with the switching delay between transmission and reception.

A mobile terminal also has known delays when switching the center frequency and switching between transmission and reception. These delays are independent from each other and independent from the base station switching delay. In mobile terminals, the frequency hop is not very fast, e.g., 100 µs.

A base station allows each mobile terminal to settle its receiver to receive at least every nth scheduling info (including the associated training symbols), where n is the amount of super frames covered by a single scheduling information block. A base station also allows handover measurements. Further, base stations are optimized for using those channels which create lowest overhead and minimize the mobile station power consumption while respecting QoS (quality of service) requirements.

In this context, the base station can be understood as being any device providing the type of radio access described herein. An example of a device with limited functionality would be a repeater, which echoes the signals it receives to a base station, when the range of the mobile terminal would otherwise not be enough. In the case of a repeater base station operating in the same radio interface and frequency as the interface to the terminal, scheduling should also allocate time for the access of the repeater to the fixed infrastructure (base station).

Without a network connection, mobile terminals start to scan narrowband frequencies for system information and for sufficient field strength. Terminals use narrowband channels to associate themselves to the network.

While in idle mode, the mobile terminal camps on a preferred base station. The mobile terminal decodes system information from the selected base station and performs RSSI (received signal strength indicator) measurements from the narrowband channel of its own and neighboring cells and uses the narrowband channel to transmit the required idle mode signaling.

In an exemplary embodiment, narrowband is used in idle mode operation. While in low activity mode, mobile terminals perform as in idle mode. It is advantageous to operate in idle mode with a narrow bandwidth due to the smaller required sampling rate of the ADC (analog to digital converter). The power, which is consumed by the ADC, is several times larger in wideband MIMO (multiple input, multiple output) transceivers than in the narrow band SISO (single in, single out) or MIMO case.

If the signal received during the idle mode is changed to a narrower bandwidth, the sampling frequency of the ADC can be decreased significantly. Since the power consumption of the ADC is directly proportional to the sampling frequency and to the number of bits, the total idle time of the mobile device is increased dramatically. In MIMO systems, one way to reduce the power consumption is to use only one antenna branch in idle mode. This means that all other antenna branches are switched off. Additionally, this leads to significant power consumption savings in a whole RF chain including also the blocks between the antenna and ADC. This feature is applicable to other radio systems using MIMO. The scaling of the number of the antennas in the idle mode can be applied to all multi-antenna radios including 3G and WLAN. Additionally, the use of a narrow band signal in the idle mode can be applied to all standards using wide bandwidth. These standards can be related to, for example, 802.11.

In active mode, a mobile terminal receives system information transmitted using the narrowband channel. Based on this information received from the network, the mobile terminal switches between narrowband, wideband, and possibly other alternative channel configurations. The mobile terminals produce and transmit measurement data relevant for the network to determine which channel bandwidth to use. The measurement data includes information such as received signal power, interference power, channel estimation parameters related to MIMO configuration, needed throughput and needed air interface packet sizes.

It is also possible (where several antennas are not needed for the reception) to receive narrow band and wide band signals at the same time if the receiver has parallel receiver chains and two synthesizers. Mobile terminals are capable of adapting their center frequencies, sampling clocks and filters according to predefined delay requirements.

Figure 5:
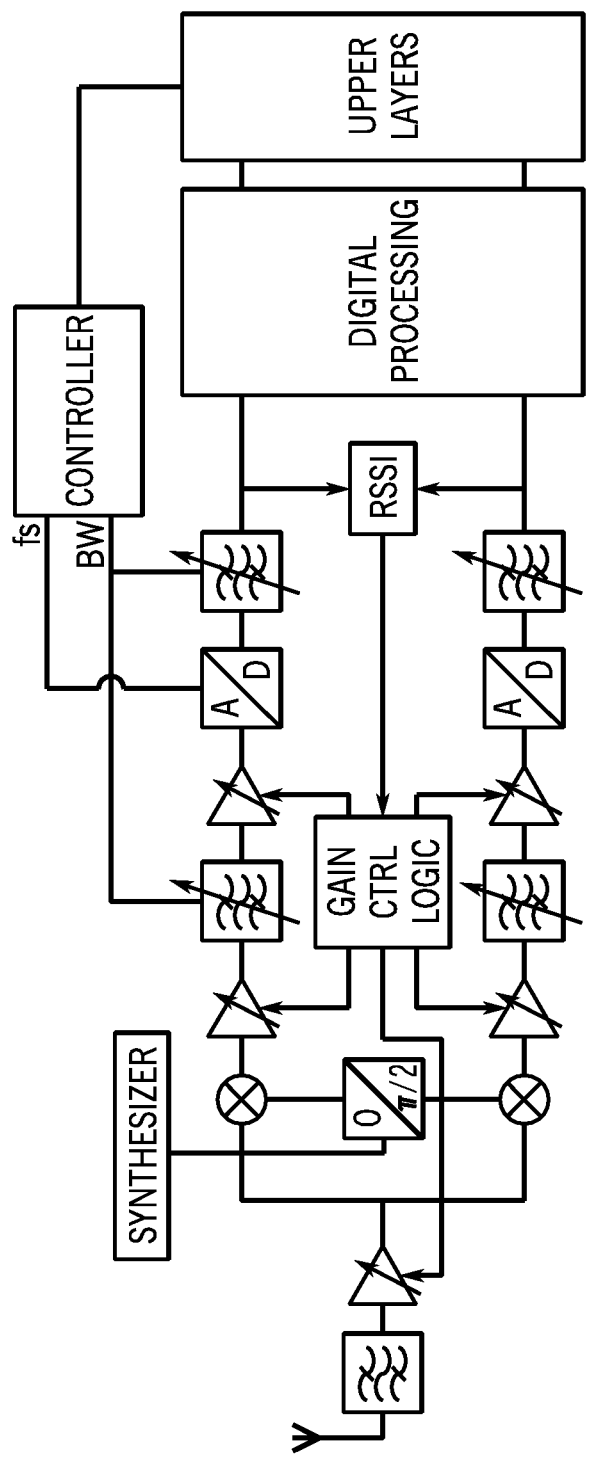
FIG. 5 is a schematic diagram of a direct conversion receiver for a mobile station (MS) and a base transceiver system (BTS), which can change the sampling frequency and bandwidth adaptively in accordance with an exemplary embodiment.
Figure 6:
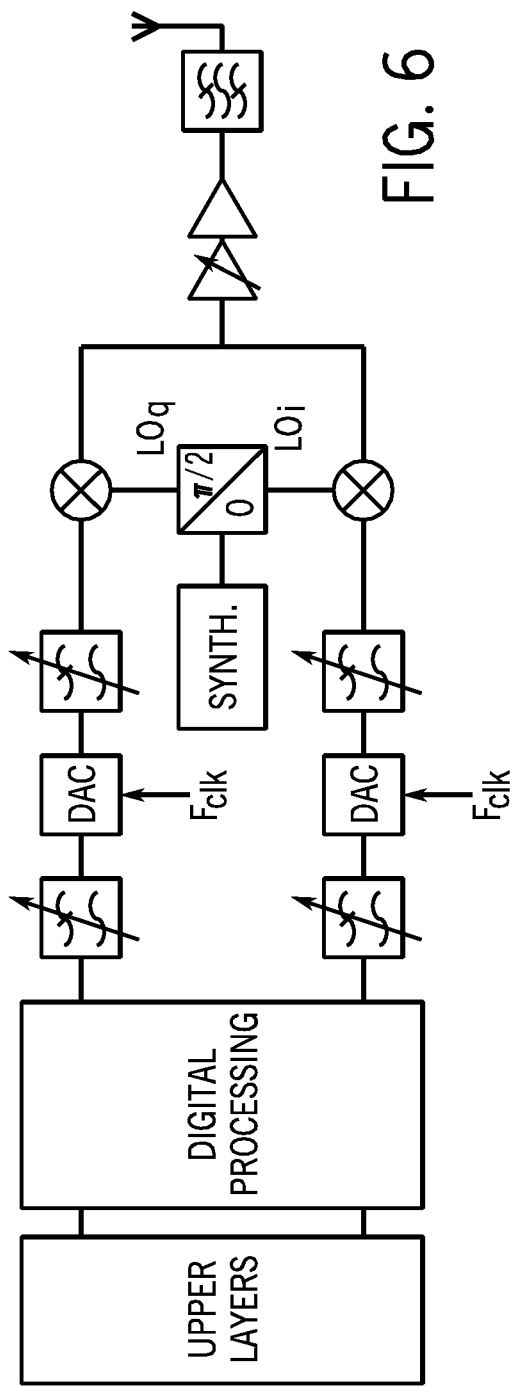
FIG. 6 is a schematic diagram of a direct conversion transmitter for a mobile station (MS) and a base transceiver system (BTS), which can change the sampling frequency and bandwidth adaptively in accordance with an exemplary embodiment.

FIG. 5 illustrates an example direct conversion receiver for a mobile station (MS) and a base transceiver system (BTS). This receiver can change the sampling frequency and bandwidth adaptively. FIG. 6 illustrates an example direct conversion transmitter for MS and BTS, which can change the sampling frequency and bandwidth adaptively. The controller part can be similar to the receiver part. These receivers and transmitters can be used in an implementation where narrowband channels are used along with full bandwidth channels.

Figure 7:
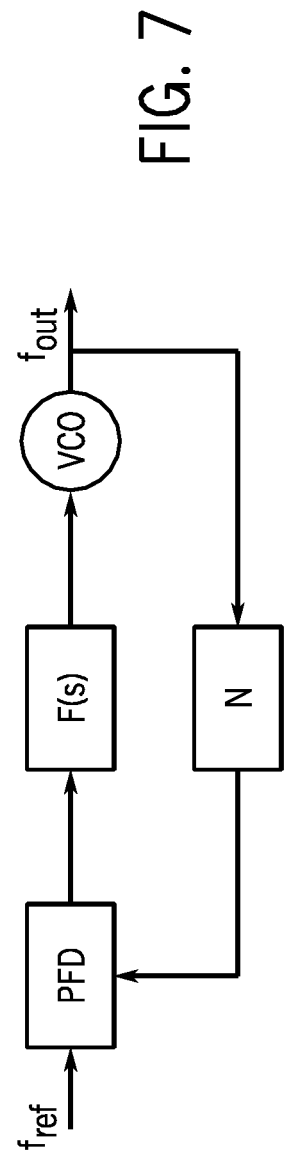
FIG. 7 is a schematic diagram of a basic integer N synthesizer structure where the frequency is changed by changing the N divider value in accordance with an exemplary embodiment.

FIG. 7 illustrates an integer N synthesizer structure where N is a division number, PDF is a phase-frequency detector, F(s) is a loop filter, and VCO is a voltage controlled oscillator. The frequency is changed by changing the N divider value. This synthesizer can be utilized in various implementations communicating different frequencies, such as the narrow band and wide band frequencies discussed.

In one communication implementation, complete coverage is provided with one wide 100 MHz carrier. Narrowband channels are used for added flexibility in data scheduling. Such a system may require spreading (e.g., OFDM). If a re-use of 1 doesn't work, then the traditional way to increase the re-use leads to a spectrum requirement of minimum 300 MHz/operator, which is very high considering spectrum availability. The exemplary embodiments described herein lowers the operator spectrum requirement, which requires a re-use higher than 1.

In an exemplary embodiment, external narrowband carriers are used in an intelligent underlay/overlay (IUO) system such as the system described in U.S. Pat. No. 6,091,955 which is assigned to the same assignee as the present application and incorporated herein by reference in its entirety. According to an exemplary embodiment, external narrowband carriers are used in an underlay/overlay system including carriers of different bandwidths.

In another exemplary embodiment, narrowband carriers allocated on frequencies inside the main wideband carrier are used, resulting in lower spectrum requirements. The wideband and narrowband carriers alternate and cannot be used in the same cell at the same time. If the narrowband carrier is used for achieving full coverage or otherwise for extending cell range, it is beneficial to coordinate narrowband frequencies in neighboring cells in such a way that different narrowband carrier frequencies are used in adjacent cells With uncoordinated use, the interference from narrowband carriers to the wideband transmission of neighboring cells can be quite severe. With coordinated use, on the other hand, the flexibility of an individual cell to change the mix of wideband and narrowband is limited.

This detailed description outlines exemplary embodiments of a method, device, and system for the use of variable bandwidth to increase re-use in a communication system. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:
1. A method comprising:
dividing radio frequencies of a wireless communication system into a wideband channel radio frequency and a plurality of narrowband channel radio frequencies; and communicating user data using a same modulation technique to an apparatus using both the wideband channel radio frequency and the plurality of narrowband channel radio frequencies in the wireless communication system;

wherein the wireless communication system is configured to select between use of the wideband channel radio frequency and use of at least one of the plurality of narrowband channel radio frequencies for communication of the user data, wherein the selection comprises a determination as to whether a wideband frequency or, alternatively, a narrowband frequency, is to be selected, with the determination being based on whether the apparatus is in a cell boundary region.

2. The method of claim 1, wherein a higher frequency re-use factor is applied to the plurality of narrowband channel radio frequencies.

3. The method of claim 1, wherein, in at least some cells of the communication system, both the plurality of narrowband channel radio frequencies and the wideband channel radio frequency are allocated so that the plurality of narrowband channel radio frequencies are used to extend cell range.

4. The method of claim 1, wherein the plurality of narrowband channel radio frequencies are divided among adjacent communication cells in such a way that adjacent cells are using different narrowband channel radio frequencies.

5. The method of claim 1, wherein the plurality of narrowband channel radio frequencies are located outside of a wideband channel.

6. The method of claim 1, wherein the method incorporates spreading for implementing spectrum sharing between adjacent cells.

7. The method of claim 1, wherein the plurality of narrowband radio channel frequencies are located inside of a wideband channel.

8. The method of claim 1, wherein at least one communication cell includes a repeater configured to operate using both the wideband channel radio frequency and the plurality of narrowband channel radio frequencies.

9. The method of claim 1, further comprising transmitting communication scheduling information to the apparatus using one of the plurality of narrowband channel radio frequencies.

10. The method of claim 1, wherein the plurality of narrowband channel radio frequencies are assigned to different communication cells.

11. An apparatus comprising:
at least one processor;
non-transitory memory storing computer program code;
wherein the memory storing the computer program code is configured to, with the at least one processor, cause the apparatus to at least:
control a transceiver to modulate, using a same modulation technique, at least one wideband bandwidth carrier and at least one narrowband bandwidth carrier within the wireless communication system;
control the transceiver to receive system information from a base station, with the system information including information indicating whether the apparatus is in a cell boundary region; and
select between use of the wideband channel radio frequency and use of at least one of the plurality of narrowband channel radio frequencies for communication of the user data, wherein the selection comprises a determination as to whether a wideband frequency or, alternatively, a narrowband frequency, is to be selected, with the determination being based on the system information indicating whether the apparatus is in a cell boundary region.

12. The apparatus of claim 11, wherein the at least one narrowband bandwidth carrier is outside of a full bandwidth channel and implements spreading.

13. The apparatus of claim 11, further comprising multiple antennas operatively connected to the transceiver.

14. The apparatus of claim 11, wherein the wireless communication system is further configured to support the at least one narrowband bandwidth carrier for communication when the apparatus is in an idle mode.

15. The apparatus of claim 11, wherein the processor is further configured to process the information using one of the at least one narrowband bandwidth carrier.

16. The apparatus of claim 15, wherein the information comprises scheduling information and includes a terminal identity for a terminal that will use a channel.

17. A method comprising:
transmitting or receiving user data, using a same modulation technique, wherein the transmitting or receiving is performed using a wideband channel radio frequency or at least one narrowband channel radio frequency;
receiving system information from a base station, with the system information being based at least in part on whether an apparatus is in a cell boundary region; and
wherein a selection is made between use of the wideband channel radio frequency and use of the at least one narrowband channel radio frequency for the transmitting or receiving, wherein the selection comprises a determination as to whether a wideband frequency or, alternatively, a narrowband frequency, is to be selected, with the determination being based on the system information indicating whether the apparatus is in a cell boundary region.

18. An apparatus comprising:
at least one processor;
non-transitory memory storing a program of instructions;
wherein the memory storing the program of instructions is configured to, with the at least one processor, cause the apparatus to at least:
divide radio frequencies of the wireless communication system into a wideband channel radio frequency and a plurality of narrowband channel radio frequencies; and
control a radio communication device to communicate user data to the at least one mobile station, using a same modulation technique, using both the wideband channel radio frequency and the plurality of narrowband channel radio frequencies in the wireless communication system, wherein the wireless communication system is configured to select between using the wideband channel radio frequency and using at least one of the plurality of narrowband channel radio frequencies for communication of the user data, wherein the selection comprises a determination as to whether a wideband frequency or, alternatively, a narrowband frequency, is to be selected, with the determination being based on whether the apparatus is in a cell boundary region.

19. The apparatus of claim 11, wherein the apparatus is configured to use a wideband bandwidth carrier when the apparatus has good channel conditions, the apparatus is configured to use a first narrowband bandwidth carrier when the apparatus approaches a cell border, and the apparatus is configured to use a second narrowband bandwidth carrier when the apparatus crosses the cell border.

20. An apparatus comprising:
at least one processor;
non-transitory memory storing a program of instructions;
wherein the memory storing the program of instructions is configured to, with the at least one processor, cause the apparatus to at least:
control an apparatus to communicate user data using at least one wideband bandwidth carrier and at least one narrowband bandwidth carrier in a wireless communication system, wherein selecting between using at least one wideband bandwidth carrier and using at least one narrowband bandwidth carrier to communicate the user data comprises a determination as to whether a wideband frequency or, alternatively, a narrowband frequency, is to be selected, with the determination being based on whether the apparatus is in a cell boundary region.

* * * * *